United States Patent [19]

Cooper et al.

[11] 4,071,500

[45] Jan. 31, 1978

[54] PROCESS FOR RECOVERY OF CATALYST FROM POLYMERIZATION OF POLYPHENYLENE ETHERS

[75] Inventors: Glenn Dale Cooper, Delmar; Daniel Edwin Floryan, Glenmont, both of N.Y.

[73] Assignee: General Electric Company, Pittsfield, Mass.

[21] Appl. No.: 749,761

[22] Filed: Dec. 13, 1976

[51] Int. Cl.$^2$ .................. C08G 65/44; C08G 65/45
[52] U.S. Cl. ............................................. 260/47 ET
[58] Field of Search ................................. 260/47 ET

[56] References Cited

U.S. PATENT DOCUMENTS

| | | | |
|---|---|---|---|
| 3,733,301 | 5/1973 | Modan | 260/47 ET |
| 3,838,102 | 9/1974 | Bennett et al. | 260/47 ET |
| 3,951,917 | 4/1976 | Floryan et al. | 260/47 ET |

*Primary Examiner*—Lester L. Lee
*Attorney, Agent, or Firm*—Morgan, Finnegan, Pine, Foley & Lee

[57] ABSTRACT

A process for the recovery of copper catalyst from the polymerization of polyphenylene ethers comprises forming a complex of the catalyst and an amino acid chelating agent, separating the complex from the polymerization mixture, contacting the complex with a reducing sugar in an alkaline medium to precipitate the copper as an oxide and, optionally, acidifying the alkaline medium to precipitate and recover the amino acid chelating agent.

23 Claims, No Drawings

PROCESS FOR RECOVERY OF CATALYST FROM POLYMERIZATION OF POLYPHENYLENE ETHERS

This invention provides a process for the removal and subsequent recovery of copper catalysts from mixtures in which polyphenylene ethers are formed.

BACKGROUND OF THE INVENTION

The polyphenylene ethers and processes for their preparation are known in the art and described in numerous publications including Hay, U.S. Pat. Nos. 3,306,874 and 3,306,875, both of which are hereby incorporated by reference. Other patents which show the preparation of polyphenylene ethers include Price et al., U.S. Pat. No. 3,382,212 and Kobayashi et al, U.S. Pat. No. 3,455,880, which are also incorporated by reference. Patents which show the recovery of polyphenylene ethers include Bennett and Cooper, U.S. Pat. No. 3,838,102 and Floryan and Watson, U.S. Pat. No. 3,951,917, both of which are incorporated by reference.

The processes most generally used to produce the polyphenylene ethers involve the self-condensation of a monovalent phenol, such as 2,6-xylenol, in the presence of an oxygen-containing gas and a catalyst comprising a copper-amine complex.

On polymerization of the phenol to form the polyphenylene ether, e.g., 2,6-xylenol to form poly(2,6-dimethyl-1,4-phenylene)ether, and using a copper-amine catalyst, e.g., copper-dibutylamine, or copper-N,N'-di-t-butylethylenediaminedimethylbutylamine, the copper must ultimately be removed from the polymerization mixture before isolation of the product in order to achieve acceptable product polymers, in terms of color, stability, and the like. A very efficient way to accomplish removal of the copper catalyst is to use a chelating agent of the amino acid type, such as nitrilotriacetic acid (NTA) or ethylenediamine tetraacetic acid (EDTA), as aqueous solutions of their sodium salts, to extract the copper-containing organic polymer solution, followed by separation of the aqueous copper-amino acid chelate solution.

It is obviously desirable to provide a means to separate the copper from the complex with amino acid chelate in such a way that both can be reused, because these are generally both expensive materials and since disposal is often difficult. The present invention provides such a means.

It has been discovered that the copper catalyst of a polyphenylene ether polymerization can be effectively recovered from the aqueous copper-amino acid chelate extract solution of a polyphenylene ether polymerization mixture by treating the copper-amino acid extract with glucose or a similar reducing sugar in the alkaline medium, preferably, at a moderately elevated temperature. The copper catalyst is recovered as an oxide of copper, e.g., cuprous oxide, in the form of a precipitate, in nearly quantitative yield. Thereafter, the amino acid chelating agent can be recovered from the effluent, after removal of the copper precipitate, by acidifying, e.g., to a pH of less than 2, which causes the precipitation of the amino acid and facilitates its recovery in very high yields.

Upon isolation and recovery of the copper and amino acid, these can readily be recycled. For example, cuprous oxide can be redissolved with aqueous hydrobromic acid or mixtures of hydrobromic acid and bromine to form an active copper catalyst. The amino acid is readily redissolved with aqueous alkali to form a soluble salt, which is then used for subsequent extraction of a polyphenylene ether reaction mixture to remove copper.

Several reports are known concerning the reduction of copper (II) from copper (II)-EDTA and copper (II)-NTA chelates in connection with oxidations of various reducing sugars. See Wagreich and Harrow, Analytical Chemistry, 25, No. 12, p. 1925 (1953); Heunart Chemical Abs., 62, 97976; and Yashida, Murakami and Hayakawa, Chemical Abs., 63, 15084 E. In these reports, however, large excesses of the copper-EDTA and copper-NTA chelates were employed to fully oxidize the sugars as a semiquantitative determination of the amount of sugar present. There is no suggestion that the reaction could form the basis of the instant recovery process. It is surprising to find that a rapid and quantitative separation of copper can be achieved using less than 1 mole of sugar per gram-atom of copper.

DESCRIPTION OF THE INVENTION

This invention provides in a process for forming a polyphenylene ether by an oxidative coupling reaction in the presence of a copper-amine complex catalyst comprising passing an oxygen-containing gas through a reaction solution of a phenol and said complex catalyst and terminating the reaction and separating the copper component of said catalyst by contacting the reaction solution with a chelating agent comprising an amino acid to form a chelated complex of copper and said chelating agent, the improvement which comprises separating and contacting said chelated complex with a reducing sugar in an alkaline medium to precipitate the copper in the form of an oxide.

According to a preferred aspect of the present invention, the process will also include the steps of recovering the oxide of copper from the alkaline medium and thereafter acidifying the alkaline medium to precipitate the chelating agent. A further preferred aspect is to recycle the recovered oxide of copper and/or the recovered chelating agent into a subsequent polymerization reaction.

In general, the amount of reducing sugar used can vary broadly, but preferably, at least 0.20 mole and up to 10.0 moles (or more) per mole of copper will be used. The alkaline medium preferably comprises water, a strong base, e.g., a hydroxide base, such as an alkali metal hydroxide, e.g., sodium hydroxide, and, preferably, at least about 2 equivalents of hydroxide per mole of copper will be used. The temperature of contacting can vary, but generally a mildly elevated temperature, e.g., within the range of from about 50° to about 70° C. will be preferred. The time of contact can also vary, but usually a time between about 2 and about 60 minutes will be adequate.

A number of reducing sugars can be employed, for example, any mono-, di- or polysaccharide which contains free aldehyde or keto groups which are not in glucoside combination with other molecules. Typically, reducing sugars are glucose, fructose, lactose, maltose, and the like, and glucose is preferred.

The chelating agent can be added in the form of an aqueous solution although this is not essential. If a dry solid is employed, the free water formed in the polyphenylene ether synthesis will ordinarily be sufficient to dissolve the salt.

A wide variety of amino acid chelating agents are effective in the present process. In general, however, the preferred agents will comprise a polyfunctional carboxylic amino acid containing compound, such as nitrilotriacetic acid, glycine, or a polyalkylenepolyamine polycarboxylic acid, an animopolycarboxylic acid, or an aminocarboxylic acid, and their alkali metal, alkaline earth metal or mixed alkali metal-alkaline earth metal salts. Illustratively, the chelating agents will include ethylenediaminetetraacetic acid, hydroxyethylethylenediaminetriacetic acid, diethylenetriaminepentaacetic acid or a mono-, di- or tri- and tetrasodium salt thereof, or of nitrilotriacetic acid, and glycine, and their corresponding salts.

The preferred salts of ethylenediaminetetraacetic acid are the di-, tri- and tetrasodium salts. The preferred salts of nitrilotriacetic acid are the disodium and trisodium salts. Usually, these salts are employed as a 1 to 50% by weight aqueous solution, and more preferably, a 10 to 40% by weight aqueous solution. The volume of such a solution to be used is selected so that a molar ratio of the salt to copper ion is in the range of 1:1 to 10:1 or more. The preferred range is 1:1 to 2:1.

Any conventional copper ion used in the past for forming the complex catalyst will be useful in the present invention. By way of illustration, it can comprise copper (I) or copper (II). Conventional amine catalyst components such as primary, secondary and tertiary amines and polyamines are utilized.

The preferred polyphenylene ether is of the formula:

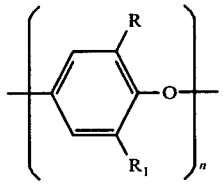

wherein the oxygen ether atom of one unit is connected to the benzene nucleus of the next adjoining unit; $n$ is an integer of at least 50; and R and $R_1$ are monovalent substituents selected from hydrogen, halogen, hyrocarbon radicals, halohydrocarbon radicals having at least 2 carbon atoms between the halogen atom and the phenyl nucleus, hydrocarbonoxy and halohydrocarbonoxy radicals having at least 2 carbon atoms between the halogen atom and the phenyl nucleus.

The most preferred polyphenylene ether is poly(2,6-dimethyl-1,4-phenylene)ether.

The polyphenylene ether-forming reaction can be carried out under a wide variety of well known process conditions. Merely by way of illustration, a copper halide can be mixed with an aliphatic amine in an aromatic solvent, then oxygen or an oxygen-containing gas can be introduced while the appropriate phenol is fed into the agitated reaction mixture at a moderate temperature, for example, in the range of 25° to 50° C. The degree of polymerization is primarily controlled by the reaction time, although catalyst activity, promoters, temperature, oxygen flow rate and other parameters have known effects. To save unnecessary explanation of those known process details, reference is made to the above-mentioned patents.

At the point where the polymerization reaction reaches the desired yield, the reaction solution will comprise a solution of polyphenylene ether, typically from 1 to 50% by weight and usually from 5 to 30% by weight, metal and amine, typically from about 0.005 to 1.5% by weight of metal and from about 0.5 to 2.0% by weight of amine and minor amounts of other materials, such as various promoters, byproducts, unreacted monomer, and the like. Such reaction solutions are then treated with the chelating agents, and then the copper from the catalyst and the chelating agent are recovered in accordance with the present process.

An especially preferred method for carrying out the process of this invention is to employ a polyphenylene ether polymerization mixture having a high solids content. The term high solids is used herein to describe those polymerization mixtures having an excess of 15% by weight of solids. There is no known upper limit to the amount of solids but it appears that 50% by weight represents a practical upper limit that would be employed according to the present invention because above that amount, the solutions of polyphenylene ether resins become quite viscous.

The polyphenylene ether resins may be recovered from the mixtures after contact with the chelating agent by conventional methods and dried to form useful molding resins, alone or in admixture with other resins, e.g., styrene resins.

DESCRIPTION OF THE PREFERRED EMBODIMENTS

The following examples are for the purpose of illustration and are not to be construed as limiting the invention.

EXAMPLE 1 a. Polymerization of Polyphenylene Ether

A mixture of 15.14 liters of toluene and 890 ml. of di-n-butylamine are placed in a ten gallon stainless steel reactor fitted with a cooling coil and agitator. To this mixture is added a solution of 29.7 g. of cupric chloride and 45.4 g. of sodium bromide in 300 ml. of methanol containing 5.5 g. of trioctyl methyl ammonium chloride. A solution of 554 g. of 2,6-xylenol in 532 g. toluene is then added, followed by addition of oxygen gas at a rate of 20 SCFH* and the further programmed addition of 4,985 g. of 2,6-xylenol in 4,789 g. of toluene over the first 45 minutes of oxygen addition. Overall molar ratio of 2,6-xylenol:copper: sodium bromide:di-n-butylamine is 200:1:2:24. Oxygen addition is maintained for 120 minutes with the temperature controlled at 43° C. Initially, then increases gradually to 49° C. after the first 60 minutes of reaction.

*Standard cubic feet per hour

At the end of oxygen addition, a solution of 259 g. of a 30 weight % solution of the disodium salt of nitrilotriacetic acid in water is added to the polymerization mixture in the reactor and agitation is maintained at 49° C. for 15 to 30 minutes. The mixture is then centrifuged in a Westfalia centigugal separator to remove the aqueous copper-nitrilotriacetic acid extract. The toluene solution of polyphenylene oxide is then mixed with 1.7 times its volume of methanol to obtain a powder, which is dried to give poly(2,6-dimethyl-1,4-phenylene)-ether of intrinsic viscosity 0.50 dl./g.

b. Removal of Copper From the Aqueous Copper-Nitrilotriacetic Acid Extract

The aqueous copper-nitrilotriacetic acid extract solution obtained in step (a) is found to contain 6,300 ppm copper. This solution is adjusted to pH 11.5 by addition of aqueous sodium hydroxide and extracted with toluene to remove residual organics. A 200 g. portion of the solution is then treated with 5.08 g. of 50% aqueous sodium hydroxide (3.2:1 mole ratio NaOH:Cu) and 5.7 g. of glucose (1.58:1 mole ratio glucose:copper) at 65° C. in a stirred vessel. Reddish, solid cuprous oxide immediately begins to precipitate. Samples are drawn at periods of 1, 3, 7, 16 and 22 minutes after addition of the glucose and sodium hydroxide and analyzed for residual copper with the results set forth in Table 1:

Table 1

| Residual Copper vs. Time for Glucose: Hydroxide:Cu of 1.58:3.2:1 at 65° C. ||
| --- | --- |
| Time (min.) | Residual Cu (ppm) |
| 1 | 46 |
| 3 | 22 |
| 7 | 24 |
| 16 | 14 |
| 22 | 8 | c. Recovery of Nitrilotriacetic Acid From the Glucose-Treated Copper-Nitrilotriacetic Acid Extract A 200 g. portion of the aqueous effluent after filtration of the cuprous oxide from the glucose-treated copper-NTA aqueous extract from a polyphenylene ether polymerization as in step (b) is treated with 27.5 g. of concentrated $H_2SO_4$ to lower the pH to ~ 0.5. The mixture is cooled overnight at +5° C. to precipitate fine crystals of nitrilotriacetic acid. These are filtered and washed with a small amount of water, then dried to give 6.64 g. of 95.5% nitrilotriacetic acid. Analysis of the filtrate shows that a residual level of 1.22 g. of nitrilotriacetic acid remains in solution, giving an overall recovered yield of 84% of the nitrilotriacetic acid. This solid nitrilotriacetic acid, on redissolving in water containing 2 moles of sodium hydroxide per mole of nitrilotriacetic acid, can then be reused for copper extraction of a polyphenylene ether reaction mixture (as the disodium salt of nitrilotriacetic acid).

d. Recycle of the Cuprous Oxide Obtained on Glucose Treatment of Copper-Nitrilotriacetic Acid Extract in a Polyphenylene Ether Polymerization The cuprous oxide filtered from a glucose-treated copper-nitrilotriacetic acid extract prepared as in step (b) is washed with a small amount of water, then dried to give a reddish powder. A 15.6 g. portion of this powder is slurried in 200 ml. of methanol, and to this slurry is added 17.6 g. of bromine and 35 g. of 48% HBr (aqueous). The mixture exotherms and the red cuprous oxide dissolves to give a dark greenish brown solution. This solution is then used as a catalyst in a polyphenylene ether reaction by the same procedure of step (a), replacing the cupric chloride/sodium bromide catalyst in methanol. At the end of polymerization (120 minutes), a sample of the reaction mixture is isolated by methanol precipitation and dried. The measured intrinsic viscosity, of the poly(2,6-dimethyl-1,4-phenylene) ether is 0.50 dl./g.

EXAMPLE 2

The procedure of Example 1, steps (a), (b) and (d) is repeated using a mixed diamine-tertiary amine catalyst system.

To a mixture of 15.14 liters of toluene, 17.94 g. of N,N'-di-tert-butyl ethylene diamine, 105 g. of dimethylbutylamine, 5.5 g. of trioctylmethylammonium chloride, and 3,250 ml. of methanol containing 136 g. of water is added a catalyst solution consisting of 3.73 g. of cuprous oxide dissolved in 200 ml. of methanol containing 52.1 g. of 2,6-xylenol and 40.7 g. of bromine, neutralized with 55 g. of di-n-butylamine. Oxygen gas is admitted at a rate of 75 SCFH and 5,539 g. of 2,6-xylenol in 5,321 g. of toluene is added over the first 30 minutes of oxygen addition. Overall molar ratio of 2,6-xylenol to copper is 860:1. Oxygen addition is maintained for 80 minutes, after which a sample of the reaction mixture is precipitated with methanol and dried to give poly(2,6-dimethyl-1,4-phenylene) ether having an intrinsic viscosity of 0.52 dl./g.

A reaction mixture prepared as above is then extracted by the addition of 62 g. of a 30% by weight aqueous solution of the disodium salt of nitrilotriacetic acid and 2,000 ml. of water, followed by phase separation of the aqueous-methanol (from the methanol in reaction) copper-NTA extract in a Westfalia liquid-liquid centrifuge. This aqueous-methanol extract is then treated with 61 g. of 50% sodium-hydroxide and extracted once with approximately 200 ml. of toluene to remove residual amines and organic polymer residues.

A 100 g. portion of the toluene-extracted aqueous-methanol copper-NTA extract (measuring 0.103% Cu) is then treated with 0.15 g. of glucose and 6.9 ml. of a 9.9% solution of sodium hydroxide at 66° C. for a period of 30 minutes. A red precipitate of cuprous oxide forms and is removed by centrifugation to give an effluent containing only 8.2 ppm copper.

A cuprous oxide sample recovered by this procedure from a diamine-catalyzed polyphenylene oxide polymerization is dried in an oven and reused in a subsequent diamine polymerization by the following procedure:

A 0.42 g. portion of recovered cuprous oxide is dissolved in 9.1 g. of 48% aqueous HBr, and this solution is added to 50 ml. of methanol containing 6.1 g. of di-N-butylamine. The resulting catalyst mixture is added to a stirred reactor containing 2,460 ml. of toluene, 212 g. of methanol (5.4% by weight water in the methanol), 2.0 g. of N,N'-di-tert-butylethylene diamine, 11.7 g. of dimethylbutylamine and 0.63 g. of trioctylmethylammonium chloride. Oxygen is admitted at a rate of 7.0 cc/min. with 2,6-xylenol (610 g. in 700 ml. of toluene) added over a 30 minute period. At the end of 70 minutes, oxygen addition is stopped and a sample of the polyphenylene ether solution is treated with methanol and precipitated to give a product of intrinsic viscosity 0.56 dl./g.

EXAMPLES 3 – 6

Portions of aqueous NTA-copper extract from a polyphenylene ether polymerization as in Example 1 are treated in a stirred vessel at 65° C. with various levels of glucose to assess the effect of glucose to copper mole ratio on the rate and extent of reaction. Amounts and residual copper levels are summarized in Table 2:

Table 2

Treatment of NTA-Copper Extract With Various Levels of Glucose at 65° C.

| Example | Amount of NTA-Copper Extract | % Cu Initial | Weight of 50% NaOH | Mole Ratio NaOH:Cu | Weight of 24% Glucose Soln. | Mole Ratio Glucose:Cu | 2min | Residual 7min | Cu in 12min | Effluent 17 min | 22 min |
|---|---|---|---|---|---|---|---|---|---|---|---|
| 3 | 3000 g. | 1.1 | 100 g. | 2.5:1 | 397 g. | 1:1 | 9.3 | 5.0 | 8.4 | 8.2 | 8.8 |
| 4 | 3000 g. | 1.1 | 100 g. | 2.5:1 | 199 g. | 0.5:1 | 8.4 | 10.0 | 6.5 | 7.5 | 5.4 |
| 5 | 3000 g. | 1.1 | 100 g. | 2.5:1 | 99 g. | 0.25:1 | 450 | 4.5 | 3.1 | 3.4 | 1.6 |
| 6 | 3000 g. | 1.1 | 100 g. | 2.5:1 | 50 g. | 0.125:1 | — | — | — | — | 1550 |

It is noteworthy that even at 0.25:1 mole ratio glucose to copper, recovery of copper is greater than 99.9% within 7 minutes.

Other modifications and variations of the present invention are possible in the light of the above teachings. For example, poly(2,6-diethyl-1,4-phenylene)ether can comprise the resin product. Instead of glucose, fructose can be used as the reducing sugar. Instead of the disodium salt of nitrilotriacetic acid, the chelating agent can comprise the trisodium salt of nitrilotriacetic acid, or the tetrasodium salt-, the trisodium salt- or the disodium salt of ethylenediaminetetraacetic acid. Instead of sodium hydroxide, potassium hydroxide can be used to provide the alkaline medium. It is, therefore, to be understood that changes may be made in the particular embodiments of the invention described which are within the full intended scope of the invention as defined by the appended claims.

We claim:

1. In a process for forming a polyphenylene ether by an oxidative coupling reaction in the presence of a copper-amine complex catalyst comprising passing an oxygen-containing gas through a reaction solution of a phenol and said complex catalyst and terminating the reaction and separating the copper component of said catalyst by contacting the reaction solution with a chelating agent comprising an amino acid to form a chelated complex of copper and said chelating agent, the improvement which comprises separating the chelated complex from the reaction solution and contacting said chelated complex with at least 0.20 moles per mole of copper of a reducing sugar in an alkaline medium, said reducing sugar being selected from the mono-, di- or polysaccharides containing free aldehyde or keto groups not in glucoside combination with other molecules, to precipitate the copper in the form of an oxide.

2. A process as defined in claim 1 which also includes the steps of recovering the oxide of copper from the alkaline medium and thereafter acidifying the alkaline medium to precipitate the chelating agent.

3. A process as defined in claim 1 wherein the reducing sugar comprises from about 0.20 to 10.0 moles per mole of copper and the alkaline medium comprises at least 2 equivalents of hydroxide per mole of copper, the temperature of contact is from about 50° to about 70° C. and the time of contact is from about 2 to about 60 minutes.

4. A process as defined in claim 2 which also includes the step of recycling the recovered oxide of copper and the recovered chelating agent into a subsequent polymerization reaction.

5. A process as defined in claim 1 wherein said polyphenylene ether is of the formula:

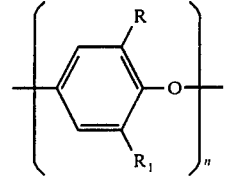

wherein the oxygen ether atom of one unit is connected to the benzene nucleus of the next adjoining unit; $n$ is an integer of at least 50; and R and $R_1$ are monovalent substituents selected from hydrogen, halogen, hydrocarbon radicals, halohydrocarbon radicals having at least 2 carbon atoms between the halogen atom and the phenyl nucleus, hydrocarbonoxy and halohydrocarbonoxy radicals having at least 2 carbon atoms between the halogen atom and the phenyl nucleus.

6. A process as defined in claim 5 wherein said polyphenylene ether is poly(2,6-dimethyl-1,4-phenylene)-ether.

7. A process as defined in claim 1 wherein said chelating agent is added to the reaction solution as an aqueous solution.

8. A process as defined in claim 7 wherein the molar ratio of the chelating agent to copper is from 1:1 to 10:1.

9. A process as defined in claim 1 wherein the chelating agent is the disodium salt of nitrilotriacetic acid.

10. A process as defined in claim 1 wherein the chelating agent is the trisodium salt of nitrilotriacetic acid.

11. A process as defined in claim 1 wherein the chelating agent is tetrasodium ethylenediaminetetraacetic acid.

12. A process as defined in claim 1 wherein the chelating agent is trisodium ethylenediaminetetraacetic acid.

13. A process as defined in claim 1 wherein the chelating agent is disodium ethylenediaminetetraacetic acid.

14. A process as defined in claim 1 wherein the reducing sugar is glucose.

15. A process as defined in claim 1 wherein the alkaline medium comprises aqueous sodium hydroxide.

16. A process as defined in claim 1 wherein the reducing sugar is selected from glucose, fructose, lactose, and maltose.

17. A process as defined in claim 1 wherein the chelating agent is selected from the group of nitrilotriacetic acid, glycine, polyalkylenepolyamine polycarboxylic acids, aminopolycarboxylic acids, aminocarboxylic acids, and the alkali metal, alkaline earth metal or mixed alkali metalalkaline earth metal salts thereof.

18. A process as defined in claim 17 wherein the chelating agent is selected from the group of ethylenediaminetetraacetic acid, hydroxyethylethylenediaminetriacetic acid, diethylenetriaminepentaacetic acid, nitrilotriacetic acid, glycine, and the mono-, di-, tri- and tetrasodium salts thereof.

19. In a process for forming a polyphenylene ether by an oxidative coupling reaction in the presence of a copper-amine complex catalyst comprising passing an oxygen-containing gas through a reaction solution of a phenol and said complex catalyst and terminating the reaction and separating the copper component of said catalyst by contacting the reaction solution with a chelating agent comprising an amino acid to form a chelated complex of copper and said chelating agent, the improvement which comprises separating the chelated complex from the reaction solution and contacting said chelated complex at a temperature of from about 50° to about 70° C with at least 0.20 moles per mole of copper of a reducing sugar in an alkaline medium said reducing sugar being selected from the mono-, di- or polysaccharides containing free aldehyde or keto groups not in glucoside combination with other molecules, to precipitate the copper in the form of an oxide.

20. A process as defined in claim 17 which also includes the steps of recovering the oxide of copper from the alkaline medium and thereafter acidifying the alkaline medium to precipitate the chelating agent.

21. A process as defined in claim 17 wherein the reducing sugar comprises from about 0.20 to 10.0 moles per mole of copper and the alkaline medium comprises at least 2 equivalents of hydroxide per mole of copper and the time of contact is from about 20 to about 60 minutes.

22. In a process for forming a polyphenylene ether by an oxidative coupling reaction in the presence of a copper-amine complex catalyst comprising passing an oxygen-containing gas through a reaction solution of a phenol and said complex catalyst and terminating the reaction and separating the copper component of said catalyst by contacting the reaction solution with a chelating agent comprising an amino acid selected from the group of nitrilotriacetic acid, glycine, polyalkylenepolyamine polycarboxylic acids, aminopolycarboxylic acids, aminocarboxylic acids, and the alkali metal, alkaline earth metal or mixed alkali metal-alkaline earth metal salts thereof, to form a chelated complex of copper and said chelating agent, the improvement which comprises separating the chelated complex from the reaction solution and contacting said chelated complex with at least 0.20 moles per mole of copper of a reducing sugar in an alkaline medium said reducing sugar being selected from the mono-, di- or polysaccharides containing free aldehyde or keto groups not in glucoside combination with other molecules, to precipitate the copper in the form of an oxide.

23. In a process for forming a polyphenylene ether by an oxidative coupling reaction in the presence of a copper-amine complex catalyst comprising passing an oxygen-containing gas through a reaction solution of a phenol and said complex catalyst and terminating the reaction and separating the copper component of said catalyst by contacting the reaction solution with a chelating agent comprising an amino acid selected from the group of nitrilotriacetic acid, glycine, polyalkylenepolyamine polycarboxylic acids, aminopolycarboxylic acids, aminocarboxylic acids, and the alkali metal, alkaline earth metal or mixed alkali metal-alkaline earth metal salts thereof, to form a chelated complex of copper and said chelating agent, the improvement which comprises separating the chelated complex from the reaction solution and contacting said chelated complex at a temperature of from about 50° to about 70° C with at least 0.20 moles per mole of copper of a reducing sugar in an alkaline medium, said reducing sugar being selected from the mono-, di- or polysaccharides containing free aldehyde or keto groups not in glucoside combination with other molecules, to precipitate the copper in the form of an oxide.

* * * * *

UNITED STATES PATENT AND TRADEMARK OFFICE
CERTIFICATE OF CORRECTION

PATENT NO. : 4,071,500
DATED : January 31, 1978
INVENTOR(S) : Glenn Dale Cooper, and Edwin Floryan It is certified that error appears in the above-identified patent and that said Letters Patent are hereby corrected as shown below:

Column 8, line 39, "claim 1" should read --claim 18--;

line 41, "claim 1" should read --claim 18--;

line 43, "claim 1" should read --claim 18--;

line 46, "claim 1" should read --claim 18--;

line 49, "claim 1" should read --claim 18--;

line 52, "claim 1" should read --claim 16--;

line 64, "metalalkaline" should read --metal-alkaline--.

Column 9, line 16, "medium" should read --medium,--.

Column 10, line 10, "medium" should read --medium,--.

Signed and Sealed this

Eighth Day of May 1979

[SEAL]

Attest:

RUTH C. MASON
Attesting Officer

DONALD W. BANNER
Commissioner of Patents and Trademarks